US012514767B2

(12) United States Patent
Chizhov

(10) Patent No.: US 12,514,767 B2
(45) Date of Patent: Jan. 6, 2026

(54) EXERCISE APPARATUS FOR USE WITH A WHEELCHAIR FOR EXERCISING LOWER LIMB

(71) Applicant: Nikita Igorevich Chizhov, San Francisco, CA (US)

(72) Inventor: Nikita Igorevich Chizhov, San Francisco, CA (US)

(73) Assignee: Nikita Igorevich Chizhov, San Francisco, CA (US)

( * ) Notice: Subject to any disclaimer, the term of this patent is extended or adjusted under 35 U.S.C. 154(b) by 216 days.

(21) Appl. No.: 18/446,209

(22) Filed: Aug. 8, 2023

(65) Prior Publication Data

US 2025/0049619 A1 Feb. 13, 2025

(51) Int. Cl.
*A61G 5/10* (2006.01)
*A63B 21/00* (2006.01)
*A63B 22/06* (2006.01)

(52) U.S. Cl.
CPC ............ *A61G 5/10* (2013.01); *A63B 21/4015* (2015.10); *A63B 21/4034* (2015.10); *A63B 22/0694* (2013.01); *A63B 2022/0617* (2013.01); *A63B 2022/0652* (2013.01); *A63B 2208/0228* (2013.01)

(58) Field of Classification Search
CPC .. A61G 5/10; A63B 21/4015; A63B 21/4034; A63B 22/0694; A63B 2022/0617; A63B 2022/0652; A63B 2208/0228; A63B 2022/0652; A63B 22/0605; A63B 2071/0018
See application file for complete search history.

(56) References Cited

U.S. PATENT DOCUMENTS

| | | | | | |
|---|---|---|---|---|---|
| 4,274,651 | A * | 6/1981 | Dumont | B62M 1/14 | 280/250 |
| D277,089 | S * | 1/1985 | Tosti | D12/107 | |
| 4,560,181 | A * | 12/1985 | Herron | A61G 5/023 | 280/244 |
| 4,572,501 | A * | 2/1986 | Durham | A63B 22/001 | 601/36 |
| 5,242,179 | A * | 9/1993 | Beddome | A63B 22/001 | 474/134 |
| 11,986,427 | B2 * | 5/2024 | Guo | A63B 23/0476 | |
| 2015/0141212 | A1 * | 5/2015 | Wu | A63B 23/08 | 482/80 |
| 2019/0168069 | A1 * | 6/2019 | Chizhov | A61H 1/0237 | |

* cited by examiner

*Primary Examiner* — Andrew M Kobylarz

(57) ABSTRACT

Disclosed is an exercise apparatus for use with a wheelchair (102) for exercising lower limb of a user. The exercise apparatus includes various mechanical attachments (104*a*, and 104*b*), housings (112*a*, and 112*b*), shafts (114*a*, and 114*b*), and pedals (116*a*, and 116*b*). The mechanical attachments (104*a*, and 104*b*) include various proximal ends (106*a*, and 106*b*) and distal ends (108*a*, and 108*b*). The proximal ends (106*a*, and 106*b*) are detachably attached to the wheels (110*a*, and 110*b*) of the wheelchair (102). The housings (112*a*, and 112*b*) are located at the distal ends (108*a*, and 108*b*) of the mechanical attachments (104*a*, and 104*b*). The shafts (114*a*, and 114*b*) are rotatably connected to the housings (112*a*, and 112*b*). The pedals (116*a*, and 116*b*) are attached to the shafts (114*a*, and 114*b*) to receive the feet of the user. The pedals (116*a*, and 116*b*) are operable to move circularly by the feet of the user seated on the wheelchair (102).

7 Claims, 5 Drawing Sheets

EXERCISE APPARATUS FOR USE WITH A WHEELCHAIR FOR EXERCISING LOWER LIMB

TECHNICAL FIELD

The presently disclosed embodiments are related, in general, to an exercise apparatus. More particularly, the presently disclosed embodiments are related to an exercise apparatus for use with a wheelchair for exercising lower limb of a user.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Exercising lower limbs can present various challenges for individuals with lower limb problems. People with lower limb problems often experience pain, discomfort, or limited range of motion in their legs. This can make it difficult to perform exercises that require repetitive movements or weight-bearing activities. Further, lower limb problems can lead to muscle weakness and imbalances, where certain muscles are overactive while others are underactive. This can affect the stability and coordination of the lower limbs during exercise and increase the risk of further injury. Some exercises or fitness equipment may not be suitable or accessible for individuals with lower limb problems. For example, individuals with mobility aids may face challenges finding equipment that accommodates their needs or adapting exercises to their abilities.

This specification recognizes that there is a need for an exercise apparatus that attaches to a wheelchair and moves legs while the wheelchair is moving.

Thus, in view of the above, there is a long-felt need in the industry to address the deficiencies and inadequacies.

Further limitations and disadvantages of conventional approaches will become apparent to one of skill in the art, through the comparison of described systems with some aspects of the present disclosure, as set forth in the remainder of the present application and with reference to the drawings.

SUMMARY

According to embodiments illustrated herein, there may be provided exercise apparatus for use with a wheelchair for exercising the lower limb of a user.

Accordingly, one aspect of the present invention is to provide an exercise apparatus for use with a wheelchair for exercising the lower limb of a user. The exercise apparatus includes various mechanical attachments, housings, shafts, and pedals. The mechanical attachments include various proximal ends and distal ends. The proximal ends are detachably attached to the wheels of the wheelchair. The housings are located at the distal ends of the mechanical attachments. The shafts are rotatably connected to the housings. The pedals are attached to the shafts to receive the feet of the user. The pedals are operable to move circularly by the feet of the user seated in the wheelchair.

In an aspect, the exercise apparatus includes a plurality of brackets connected to the plurality of pedals to secure the feet of the user.

In an aspect, the mechanical attachments include a first mechanical attachment and a second mechanical attachment.

In an aspect, the first mechanical attachment is detachably attached to a left wheel of the wheelchair.

In an aspect, the second mechanical attachment is detachably attached to a right wheel of the wheelchair.

In an aspect, the pedals move circularly while the wheelchair moves.

In an aspect, the exercise apparatus is made of steel material.

Accordingly, one aspect of the present invention is to provide a method of exercising lower limbs at mechanical attachment, which is attached to wheelchairs at both sides of the wheels left and right, and while wheelchair riding pedals move the legs in by circle movement for the exercise of lower limbs as a new rehabilitation method. Users any time can put exercising on pause and put the level of their legs at the pedals in any convenient position at any time.

These and other features and advantages of the present disclosure may be appreciated from a review of the following detailed description of the present disclosure, along with the accompanying figures in which reference numerals refer to like parts throughout.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another and vice versa. Further, the elements may not be drawn to scale.

Various embodiments will hereinafter be described in accordance with the appended drawings, which are provided to illustrate and not to limit the scope in any manner, wherein similar designations denote similar elements, and in which.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the luminaires, methods, and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that feature, structure, characteristic, property, element, or limitation. Further, repeated use of the phrase "in an embodiment" does not necessarily refer to the same embodiment.

A person skilled in the art will understand that the exercise apparatus is described herein for illustrative purposes and should not be construed to limit the scope of the disclosure.

Figure 1A:
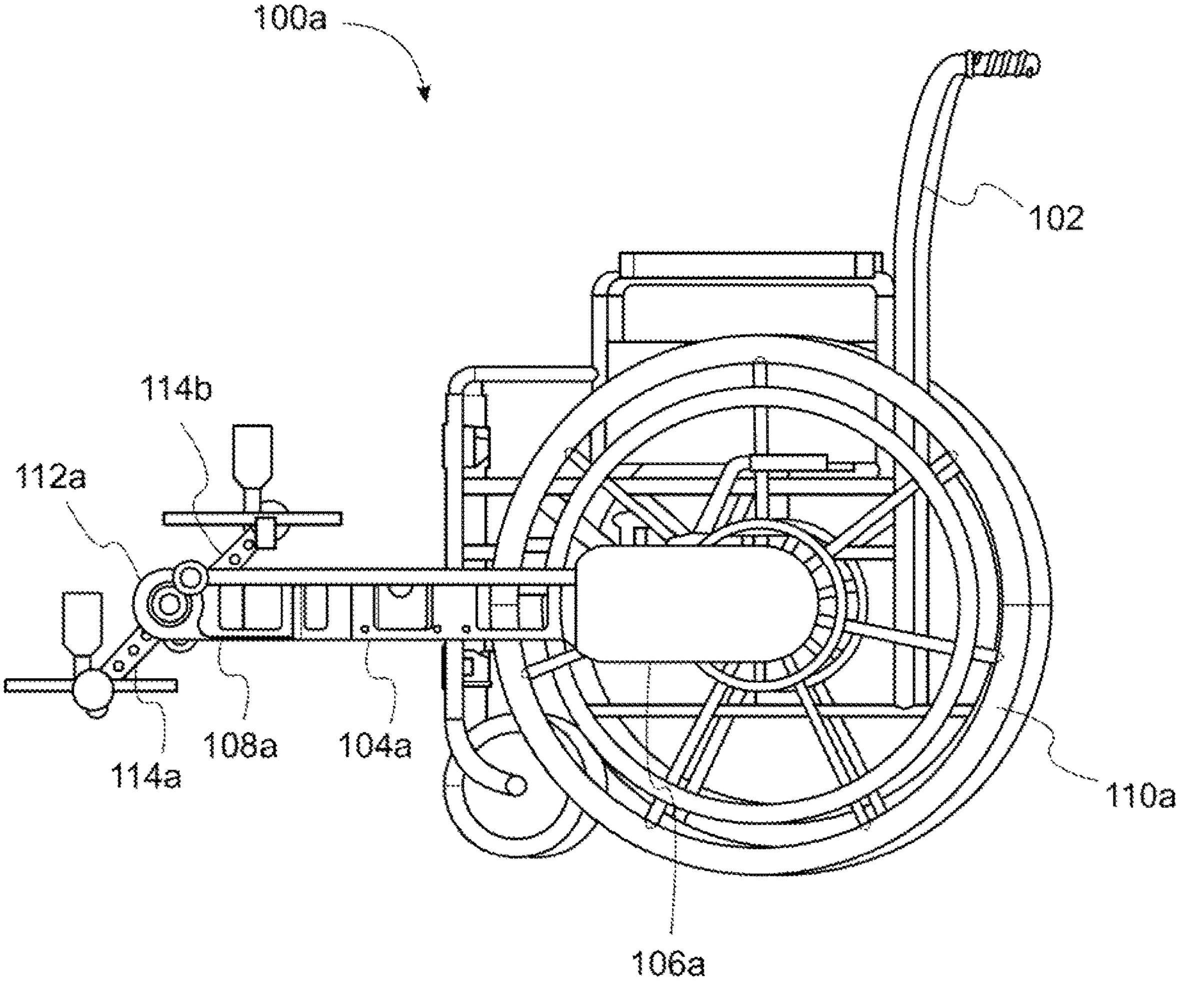
FIGS. 1A-1B illustrate perspective views of an exercise apparatus, in accordance with at least one embodiment.
Figure 1B:
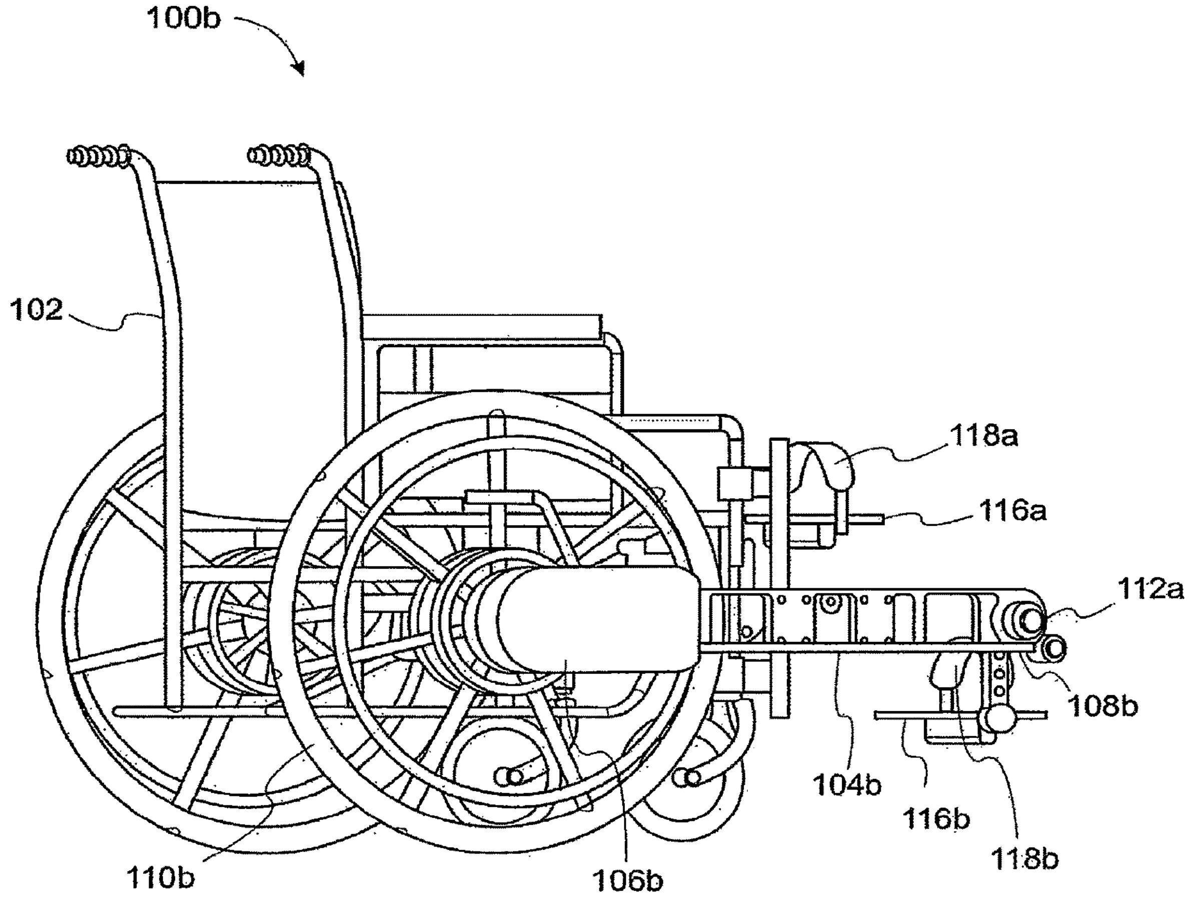

FIGS. 1A-1B illustrate perspective views 100*a* and 100*b* of an exercise apparatus, in accordance with at least one embodiment. The exercise apparatus is attached to a wheelchair (102) for exercising the lower limb of a user. The exercise apparatus includes various mechanical attachments (104*a*, and 104*b*), housings (112*a*, and 112*b*), shafts (114*a*, and 114*b*), and pedals (116*a*, and 116*b*). The mechanical attachments (104*a*, and 104*b*) include various proximal ends (106*a*, and 106*b*) and distal ends (108*a*, and 108*b*). The proximal ends (106*a*, and 106*b*) are detachably attached to the wheels (110*a*, and 110*b*) of the wheelchair (102). The housings (112*a*, and 112*b*) are located at the distal ends (108*a*, and 108*b*) of the mechanical attachments (104*a*, and 104*b*). The shafts (114*a*, and 114*b*) are rotatably connected to the housings (112*a*, and 112*b*). The pedals (116*a*, and 116*b*) are attached to the shafts (114*a*, and 114*b*) to receive the feet of the user. The pedals (116*a*, and 116*b*) are operable to move circularly by the feet of the user seated on the wheelchair (102). In an embodiment, the exercise apparatus includes a plurality of brackets (118*a*, and 118*b*) connected to the plurality of pedals (116*a*, and 116*b*) to secure the feet of the user. In an embodiment, the plurality of mechanical attachments (104*a*, and 104*b*) comprises a first mechanical attachment (104*a*), and a second mechanical attachment (104*b*). In an embodiment, the first mechanical attachment (104*a*) is detachably attached to a left wheel (110*a*) of the wheelchair (102). In an embodiment, the second mechanical attachment (104*b*) is detachably attached to a right wheel (110*b*) of the wheelchair (102). In an embodiment, the plurality of pedals (116*a*, and 116*b*) move circularly while the wheelchair (102) moves.

It should be understood the mechanical attachments (104*a*, and 104*b*), the housings (112*a*, and 112*b*), the shafts (114*a*, and 114*b*), the pedals (116*a*, and 116*b*), and the brackets (118*a*, and 118*b*) depicted can be constructed from varying materials and in varying sizes, and shapes and have different electrical outputs.

Figure 2:
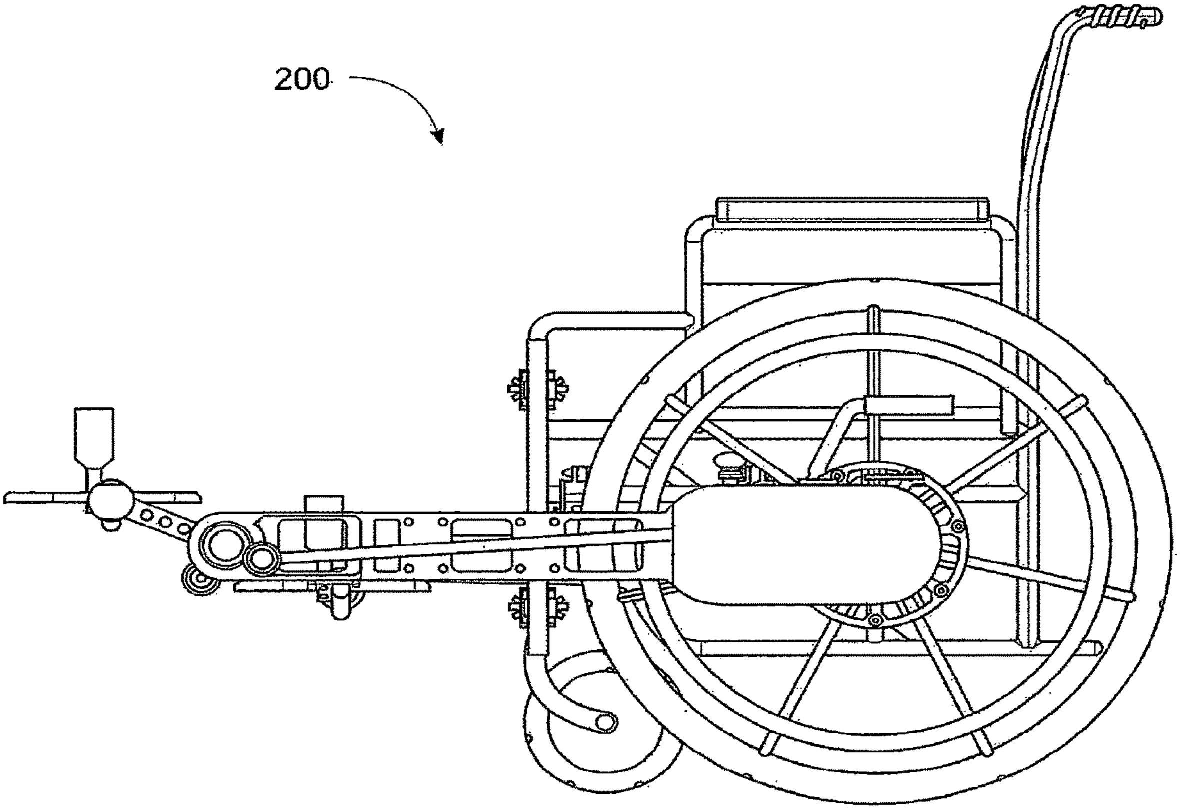
FIG. 2 illustrates a side view of the exercise apparatus, in accordance with at least one embodiment.
Figure 3:
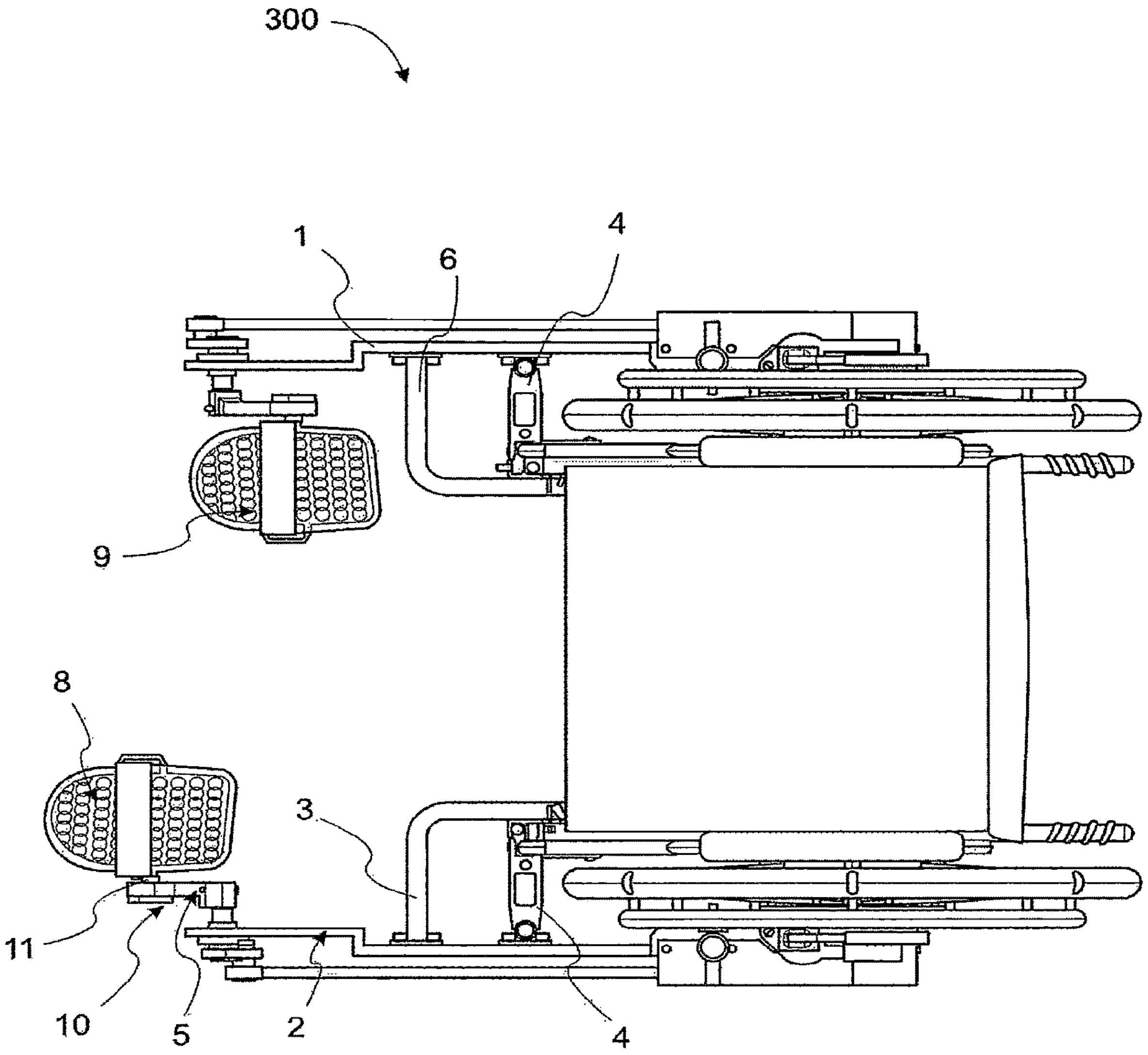
FIG. 3 illustrates a top view of the exercise apparatus, in accordance with at least one embodiment.
Figure 4:
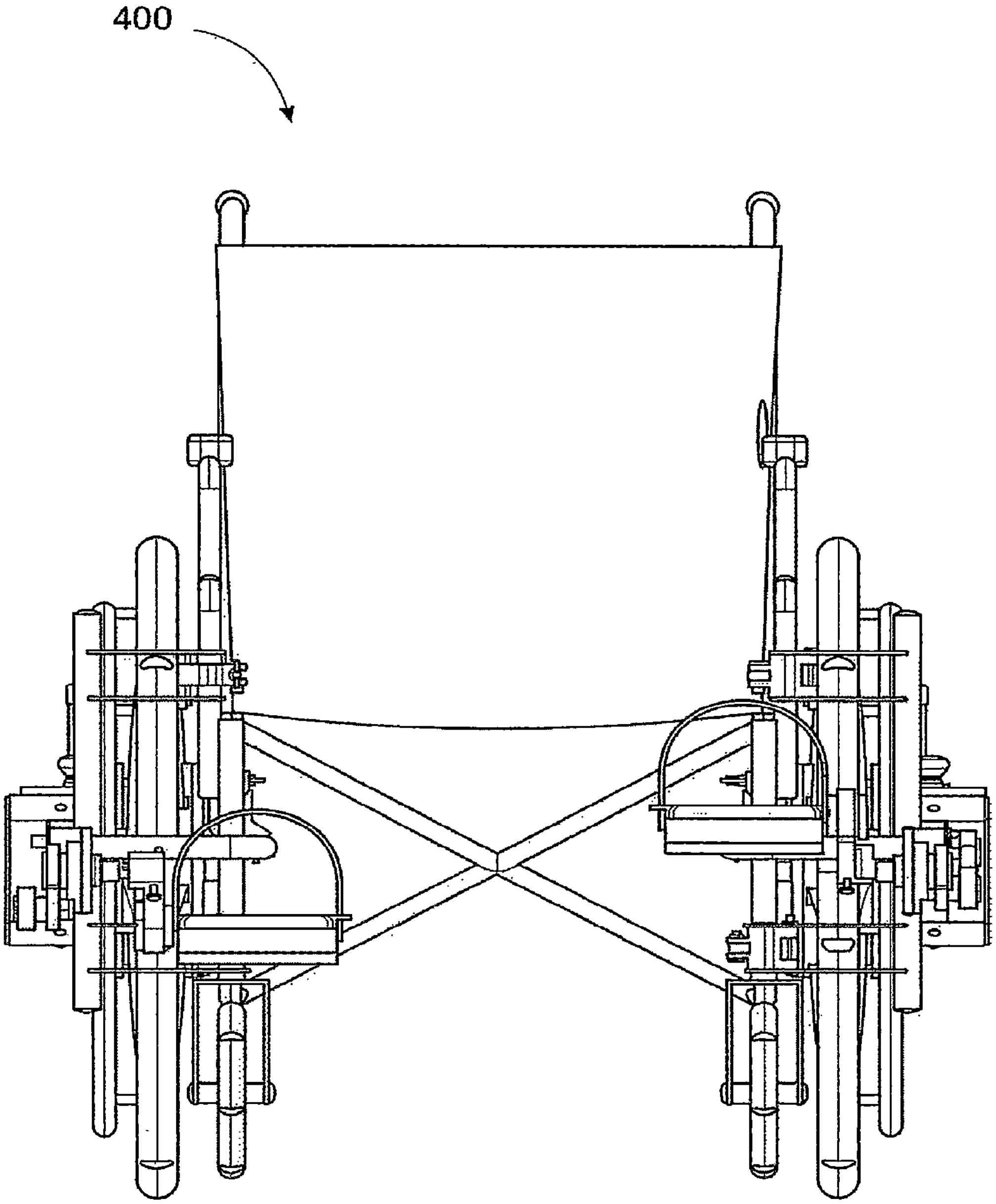
FIG. 4 illustrates a rear view of the exercise apparatus, in accordance with at least one embodiment.

FIG. 2 illustrates a side view (200) of the exercise apparatus, in accordance with at least one embodiment. FIG. 3 illustrates a top view (300) of the exercise apparatus, in accordance with at least one embodiment. FIG. 4 illustrates a rear view (400) of the exercise apparatus, in accordance with at least one embodiment. In an embodiment, the exercise apparatus is made of steel material. A person with ordinary skills in the art will appreciate that the exercise apparatus has been illustrated and explained to serve as examples and should not be considered limiting in any manner. It will be further appreciated that the variants of the above-disclosed exercise apparatus, and other features and functions, or alternatives thereof, may be combined to create other different exercise apparatuses, systems, or applications. In an embodiment, the exercise apparatus acts as a pedal exerciser that connects to the wheelchair.

Thus, the present exercise apparatus and the method are used for exercising lower limbs at mechanical attachment, that is attached to wheelchairs at both sides of the wheels left and right, and while wheelchair riding pedals move the legs in by circle movement for the exercise of lower limbs as new rehabilitation method. Users any time can put exercising on pause and put the level of their legs at the pedals in any convenient position in any time. According to an embodiment herein, the present exercise apparatus may be manual (non-electrical) as well as electrical where various sensors, electrical and electronic devices along with the artificial intelligence and machine algorithms can be used for exercising lower limb of the user.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments falling within the scope of the appended claims.

What is claimed is:

1. An exercise apparatus for use with a wheelchair to exercise lower limbs of a user of a user, comprising:
- a plurality of mechanical attachments each comprising a distal end and a proximal end wherein each proximal end of the plurality of mechanical attachments is detachably attached directly to a respective wheel of a plurality of wheels of the wheelchair;
- a housing located at each distal end of the plurality of mechanical attachments;
- a shaft rotatably connected to each respective housing of the plurality of mechanical attachments; and
- a pedal attached to each shaft of the plurality of mechanical attachments configured to receive the feet of the user, wherein the plurality of pedals are configured to move circularly by the feet of the user seated on the wheelchair.

2. The exercise apparatus according to claim 1, wherein the plurality of mechanical attachments comprise a first mechanical attachment, and a second mechanical attachment.

3. The exercise apparatus according to claim 2, wherein the first mechanical attachment is detachably attached to a left wheel of the plurality of wheels of the wheelchair.

4. The exercise apparatus according to claim 2, wherein the second mechanical attachment is detachably attached to a right wheel of the plurality of wheels of the wheelchair.

5. The exercise apparatus according to claim 1, comprises a bracket connected to each respective pedal of the plurality of mechanical attachments configured to secure the feet of the user.

6. The exercise apparatus according to claim 1, wherein each pedal moves circularly while the wheelchair moves.

7. The exercise apparatus according to claim 1, wherein the exercise apparatus is made of a steel material.

* * * * *